(12) United States Patent
Jarolim

(10) Patent No.: US 7,549,251 B2
(45) Date of Patent: Jun. 23, 2009

(54) PIVOTING SLIDING DOORS FOR VEHICLES

(75) Inventor: Reinhold Jarolim, Weyer (AT)

(73) Assignee: Knorr-Bremse Ges.m.b.H., Modling (AT)

( * ) Notice: Subject to any disclaimer, the term of this patent is extended or adjusted under 35 U.S.C. 154(b) by 368 days.

(21) Appl. No.: 10/543,054

(22) PCT Filed: Dec. 22, 2003

(86) PCT No.: PCT/EP03/14724

§ 371 (c)(1),
(2), (4) Date: Mar. 24, 2006

(87) PCT Pub. No.: WO2004/065154

PCT Pub. Date: Aug. 5, 2004

(65) Prior Publication Data

US 2006/0225356 A1 Oct. 12, 2006

(30) Foreign Application Priority Data

Jan. 21, 2003 (AT) .................................. A 76/2003

(51) Int. Cl.
*E05D 15/10* (2006.01)
(52) U.S. Cl. .......................................... 49/223; 49/221
(58) Field of Classification Search .................. 49/209, 49/208, 211, 213, 214, 221, 223, 128, 130, 49/409, 410, 411, 254, 258, 259
See application file for complete search history.

(56) References Cited

U.S. PATENT DOCUMENTS

| | | | | |
|---|---|---|---|---|
| 2,893,071 A | * | 7/1959 | Oden | 49/130 |
| 2,896,274 A | * | 7/1959 | Chris | 49/130 |
| 3,138,830 A | * | 6/1964 | Scharge | 49/130 |
| 3,293,801 A | * | 12/1966 | Henning | 49/130 |
| 3,475,860 A | * | 11/1969 | Puczynski | 49/129 |
| 3,886,685 A | * | 6/1975 | Riphagen | 49/209 |
| 3,900,964 A | * | 8/1975 | Krein | 49/214 |
| 4,565,031 A | * | 1/1986 | Sakamoto | 49/130 |
| 4,608,777 A | * | 9/1986 | Okamoto | 49/214 |
| 4,644,690 A | * | 2/1987 | Caimi | 49/130 |
| 4,669,220 A | * | 6/1987 | Dilcher | 49/219 |
| 4,708,410 A | * | 11/1987 | Mazaki | 312/138.1 |

(Continued)

FOREIGN PATENT DOCUMENTS

DE 36 30 229 A1 3/1988

(Continued)

*Primary Examiner*—Katherine W Mitchell
*Assistant Examiner*—Catherine A Kelly
(74) *Attorney, Agent, or Firm*—Barnes & Thornburg LLP

(57) ABSTRACT

A pivoting sliding door for vehicles, particularly rail vehicles or lift cabins. The pivoting sliding door includes a vehicle body, at least one door wing which, in a closed position is arranged within the vehicle body and which, in an opened position is arranged in front of and on an exterior side of the vehicle body. Further included is at least one driving device, at least two transverse guiding devices and at least one longitudinal guiding device to permit a transverse movement of the at least one door wing to and along the vehicle body. The at least one longitudinal guiding device is moved by the at least two transverse guiding devices, and the at least one door wing is locked by a pivoting part that engages in one of the at least two transverse guiding devices.

6 Claims, 9 Drawing Sheets

U.S. PATENT DOCUMENTS

| | | | | |
|---|---|---|---|---|
| 4,752,106 | A | * | 6/1988 | Salvarani .................... 312/295 |
| 4,924,625 | A | * | 5/1990 | Dilcher ........................ 49/212 |
| 4,942,694 | A | * | 7/1990 | Simoncelli .................. 49/192 |
| 4,949,504 | A | * | 8/1990 | Bortoluzzi ................... 49/130 |
| 5,142,823 | A | | 9/1992 | Brandenburg et al. |
| 5,224,296 | A | * | 7/1993 | Brignon ....................... 49/130 |
| 5,287,653 | A | * | 2/1994 | Young ......................... 49/130 |
| 5,347,757 | A | * | 9/1994 | Losito ......................... 49/255 |
| 5,996,282 | A | * | 12/1999 | Giovannetti .................. 49/130 |
| 6,286,261 | B1 | * | 9/2001 | Hackstock ................... 49/216 |
| 6,328,374 | B1 | * | 12/2001 | Patel .......................... 296/155 |
| 6,336,246 | B1 | * | 1/2002 | Giovannetti ................. 16/87 R |
| 6,860,064 | B2 | * | 3/2005 | Bakalar ....................... 49/127 |
| 2003/0070363 | A1 | * | 4/2003 | Bakalar ....................... 49/409 |

FOREIGN PATENT DOCUMENTS

| | | |
|---|---|---|
| DE | G 92 16 812.4 U1 | 4/1994 |
| DE | 43 34 403 A1 | 4/1995 |
| DE | 199 46 501 A1 | 4/2001 |
| EP | 0 400 188 | 12/1990 |
| EP | 0 517 334 A1 | 12/1992 |
| EP | 0 820 889 A1 | 1/1998 |
| FR | 2 589 938 A1 | 5/1987 |
| RU | 2 330 766 C2 | 1/2006 |

* cited by examiner

PIVOTING SLIDING DOORS FOR VEHICLES

BACKGROUND AND SUMMARY

The present disclosure relates to a pivoting sliding door for vehicles, particularly rail vehicles or lift cabins, having at least one door wing which, in a closed position, is arranged in a vehicle wall or body and which, in an opened position, is arranged on an exterior side in front of the vehicle wall or body and in the process leaves a door opening free. Driving devices as well as transversal guiding devices and longitudinal guiding devices are provided which permit a movement of the at least one door wing transversely to the vehicle wall or body and along the vehicle wall or body, the longitudinal guiding devices being moved by the transversal guiding devices.

A door drive of this type is known, for example, from European Patent Document EP 0 820 889 A. In the case of this door drive as well as in the case of many other door drives, almost the entire driving device, which is mounted on a carriage, moves along with the transversal guiding devices. It is therefore necessary to fix at least the longitudinal guiding devices but in most cases also all other driving components in the moved-out end position in order to ensure that the door wings do not strike, by their interior side, against the exterior side of the vehicle wall. Likewise, it has to be ensured that toward the end of the closing movement of the door wings along the longitudinal guiding devices, the fixing is eliminated and the transversal guiding devices cause the pull-in movement of the longitudinal guiding devices and therefore also of the door wings and, in most embodiments, of the entire carriage.

In the state of the art, this sequence of movements is achieved by a separate guide rail which is stationarily arranged with respect to the door portal and thus the car body and satisfactorily solves this problem.

Another issue is a result of the prerequisite that, in event of a power failure of the door drive, it is nevertheless ensured that the door is not opened by persons or objects striking against the door wing. Usually, in the normal closed condition of the door, the door drive is also switched to a powerless, in the case of an electric drive, to a currentless state. In this condition, even if mechanical locks are still present, it must not be possible to open the door by exercising force upon the door wing or by operating the door handle, but the door has to remain firmly and reliably closed. When the door drive is without power, it should only be possible to open the door by operating a door emergency operating device.

In the state of the art, this requirement is met by a so-called over-dead-center mechanism, in which case a rotating or pivoting part of the door drive, which is rotatably connected with a second pivoting component, in the course of the closing movement, moves along the connection line of the axes of rotation of the two components and then takes up its end position close to this so-called dead center. When force is exercised on the door wing and thus on this pivoting part, because of the rest position of the pivoting part, this force can result only in a moment which acts upon the pivoting part in the closing direction.

As reliably as such devices prevent the unintentional or unauthorized opening of the doors, this mechanism is not desirable when the door is, in fact, to be opened by the door emergency operating device, particularly if this should take place by untrained persons and/or in the event of panic. Specifically, it is very probable in these situations that pressure is already exercised on the door wings in the opening direction while it is attempted to bring the driving mechanism over the dead center by the door emergency operating device. What is a safety feature in the normal operation now counteracts the desired opening operation and extraordinary forces are required for moving the door drive over the dead center in this case. After the dead center has been overcome, the pressing persons or objects naturally initiate and aid the opening movement.

The present disclosure includes a door drive that, independently of the momentary loading of the door wing, ensures an opening of the door in the event of an emergency via a door emergency operating device always under the same kinematic and mainly dynamic conditions. In the process, the pivoting sliding door of the present disclosure requires neither more space than the currently used over-dead-center mechanism, nor results in higher investment costs.

According to the present disclosure, a pivoting part a pivoting sliding door has a guiding part interacting with a guide, and in an area in which the pivoting part in a closed position of a door wing interacts with the door wing, and the guide has a circular-arc section about a momentary position of an axis of rotation of the pivoting part.

As a result, forces acting upon the door wing generate no moment on the pivoting part and a locking takes place in an arc section which, with respect to its size, corresponds to the arc section of conventional over-dead-center mechanisms but in a neutral manner. In order to prevent that, in the course of shocks, vibrations, inclinations of the vehicle, etc., the pivoting part reaches a position in which this neutral range is left, the pivoting part is either form-lockingly or force-lockingly held in this position, for example, by a spring. For an opening, only the form-locking securing has to be eliminated or the force-locking securing, which acts with a constant and low force, has to be overcome by the door emergency operation, so that the portion of the pivoting part which interacts with the guide, leaves the neutral range, whereby the opening of the door in the event of an emergency can take place independently of the amount of the forces acting upon the door wing in the opening direction.

Other aspects of the present disclosure will become apparent from the following descriptions when considered in conjunction with the accompanying drawings.

DETAILED DESCRIPTION

Figure 1:
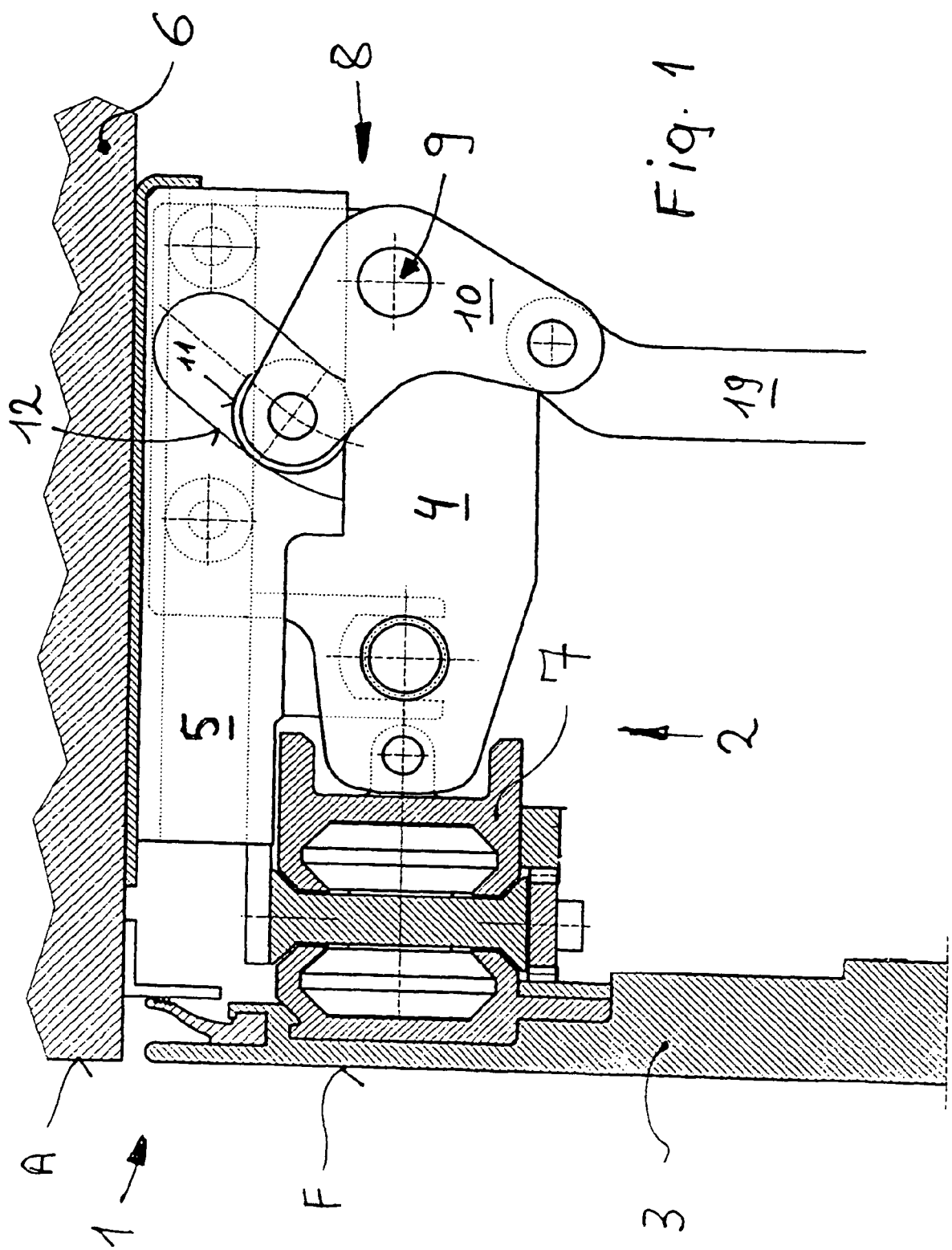
FIG. 1 is a sectional view of a pivoting sliding door in a closed position, according to the present disclosure.

FIG. 1 shows an edge area of a door 1. In the case of conventional doors of vehicles, for example, rail vehicles, in which the doors are arranged in side walls of a vehicle body 6, this section therefore extends at least essentially normal with respect to the longitudinal vehicle axis. FIG. 1 shows an area of a door mechanism 2 which, together with at least one door wing 3, is arranged on a carriage 4 which is displaceable by rollers 11 in guides 5 which are fixedly fastened on the vehicle body 6, or on a portal or frame fixedly connected with the vehicle body 6.

In a closed position illustrated in FIG. 1, an exterior surface F of the door wing 3 corresponds essentially to an exterior surface A of the vehicle body 6, as may be customary in pivoting sliding doors. The illustrated embodiment shows a telescopable door. Here, a telescope 7, which may include at least three parts is, on one side, connected with the carriage 4, and on another side with the door wing 3. This permits a displacement of the door wing 3 along the exterior side or surface A of the vehicle body 6. In conventional doors arranged on the side of a vehicle body, the displacement direction therefore extends parallel to the longitudinal axis of the vehicle (in the case of lift doors, these relationships may have a correspondingly different orientation).

TInstead of a telescope, a different sliding system can be provided. The door wing 3 or wings are mounted on the carriage 4, and it may be that guides, locks, sensors, or the like may be additions to the illustrated telescope.

Figure 2:
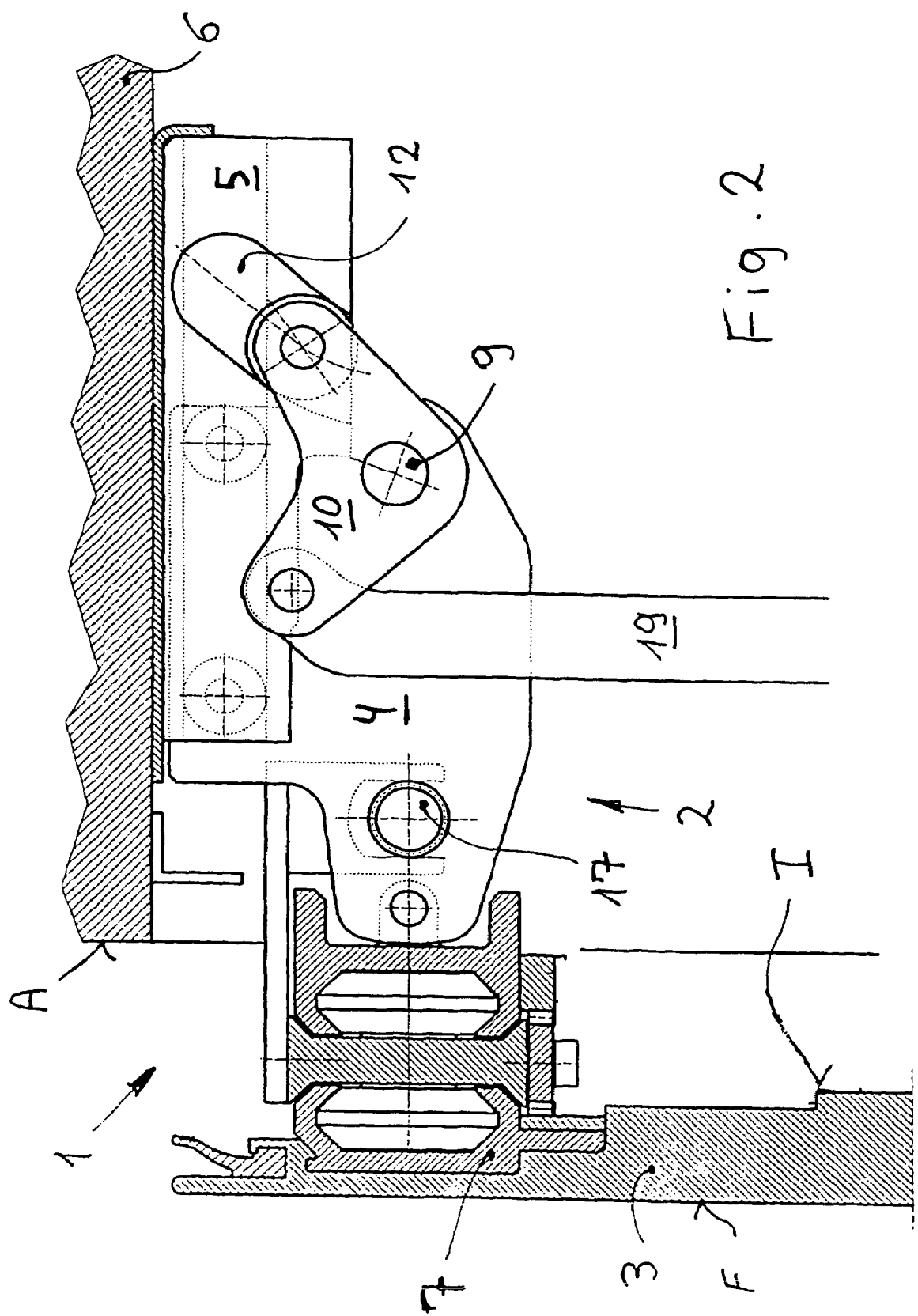
FIG. 2 is a sectional view similar to FIG. 1 with the pivoting sliding door in a moved-out position.

FIG. 2 shows the door of FIG. 1 in the same sectional view in a moved-out position. In this case, the carriage 4 is displaced in or along the guide 5 toward the exterior vehicle side, so that the door wing 3 also comes to be situated with its interior surface I outside the exterior vehicle side or surface A and can be moved along with the telescope 7 in a normal or perpendicular direction with respect to the vehicle body 6, without ramming the vehicle body 6.

Referring to FIG. 1, it should be noted that, in the case of a powerless door drive, it should be ensured that the door wing 3, when locked, is not opened by forces acting upon it except by the proper activating of a door drive or by operating a door emergency operating device. A locking device 8, according to the present disclosure, includes a locking lever 10 pivotable about an axis of rotation 9 disposed on the carriage 4. This locking lever 10 carries a guiding part or roller 11 on one end which is displaceably or rollably disposed in a guiding element or groove 12 stationary with respect to the vehicle body 6. The operation of this locking mechanism will be explained in detail below.

Figure 3:
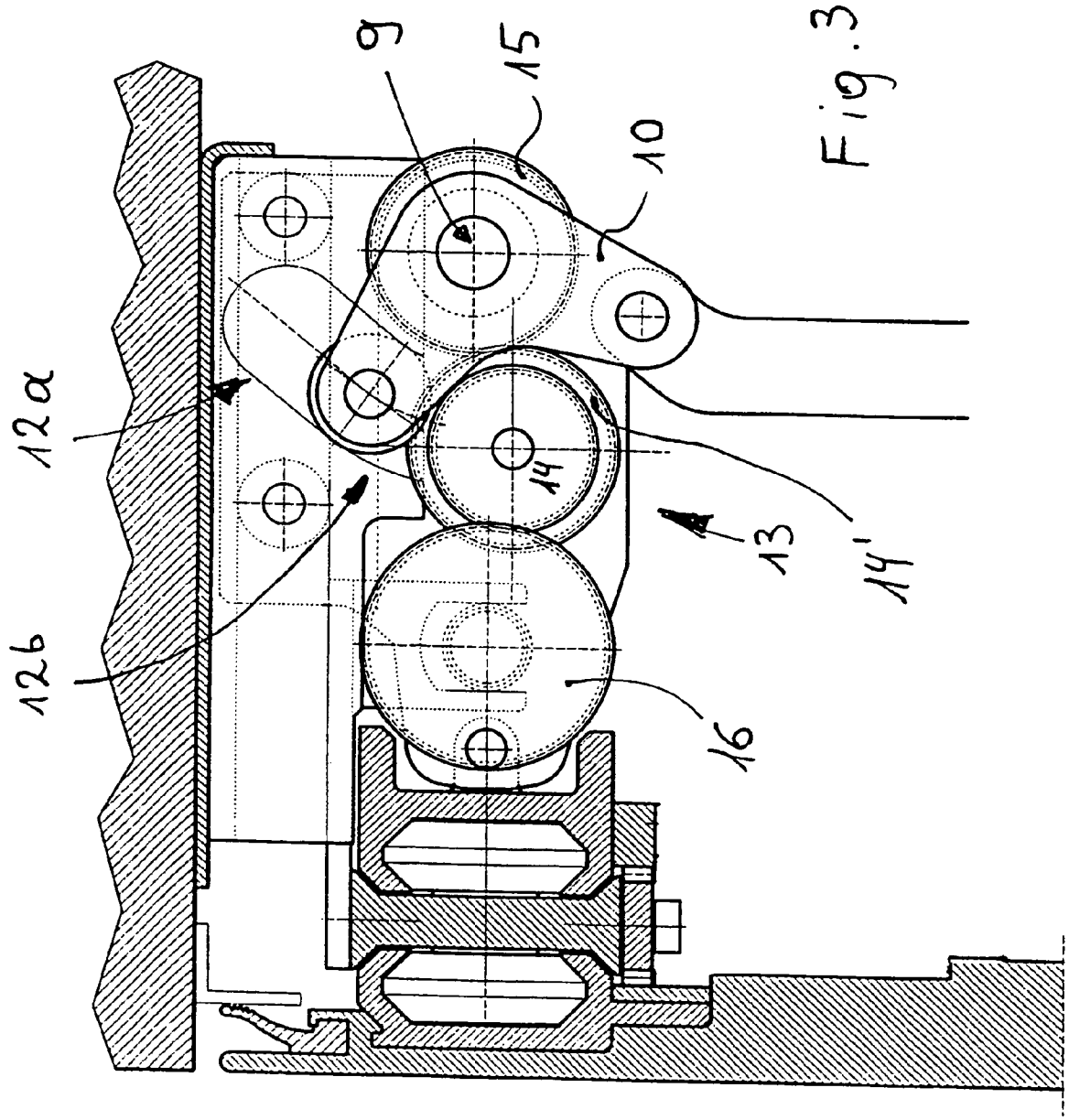
FIG. 3 is a sectional view of the pivoting sliding door of FIG. 1 including a door drive.

FIG. 3 is a sectional view similar to the sectional view of FIG. 1 in the same position of the door 1 and illustrates door drive 13. In the illustrated embodiment, a gear 14 is non-rotatably connected with an output shaft of an electric motor (not shown).

Another gear 14' is non-rotatably connected with a housing of the electric motor rotatably suspended about its output shaft. The gear 14' meshes with a gear 15 rotating in a non-rotatable manner with the locking lever 10 and thereby together with it about its axis of rotation 9. The gear 14 meshes with a gear 16 non-rotatably connected with a spindle 17 (FIG. 2). The spindle 17, in turn, together with a nut fittingly connected with the door wing 3, being responsible for longitudinal movement of the door wing 3.

A method of operation of the door drive 13 is as follows. When, starting from the position illustrated in FIG. 3, the motor starts to rotate in the opening direction, a guide (not shown) prevents the movement of the door wing 3 along the telescope 7 and thus any rotation of the spindle 17 and therefore also of the gears 16 and 14 so that, as a result of the moment of reaction of the motor, the latter, together with the gear 14', rotates in the opposite direction and thus rotates the gear 15 about the axis of rotation 9. Since the gear 15 is fixedly connected with the locking lever 10, the latter swivels (clockwise in FIG. 3) and thereby displaces the roller 11 in the groove 12.

The groove 12 has an at least essentially linear section 12a and, starting at a transition point 18 (FIG. 4), an adjoining curved section 12b. When the door 1 is closed and in a locked position, the roller 11 is situated in the curved section 12b. The curvature of the section 12b corresponds at least essentially to a curvature 12c which a circle has in the center at the point at which the axis of rotation 9 is situated when the door 1 is closed. Thus, at the start of the rotating movement of the locking lever 10 about its axis of rotation 9, a movement of the roller 11 occurs in the groove 12 which is adapted to the shape of the groove section 12b, this movement not causing any noticeable reaction forces between the roller 11 and a wall of the groove 12. Since there are no such forces, no displacement of the carriage 4 occurs in the guides 5.

When, as a result of the progressing rotation of the locking lever 10, the roller 11 arrives in the linear section 12a of the groove 12, it attempts to continue the rotating movement and in the process presses against the "lower" or "right" groove wall, which leads to a reaction force upon the roller 11 and thus upon the locking lever 10. As a result, the axis of rotation 9 and with it the entire carriage 4 together with the door drive 13 and the door mechanism 2 and the door wing 3 is displaced in a move-out movement until finally the position shown in FIG. 2 has been reached.

Figure 4:
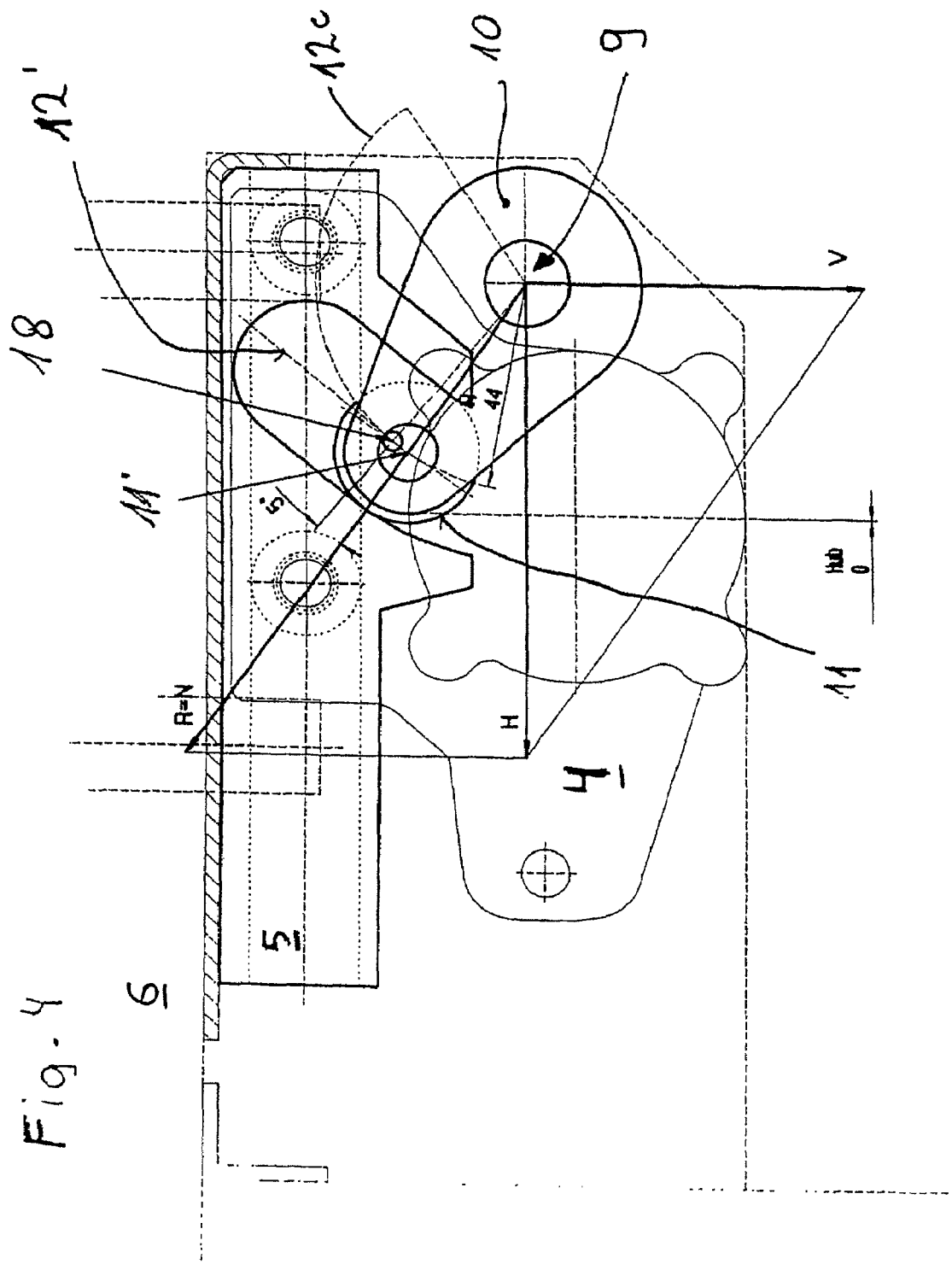
FIGS. 4-9 are enlarged views of a portion of the door mechanism in an area of a dead-center mechanism in different positions during an opening movement, according to the present disclosure.

This move-out movement is shown in greater detail in FIGS. 4 to 9, where, on the one hand, the scale of the representation is enlarged and, on the other hand, all components situated on the door 1 side of the carriage 4 were omitted for reasons of clarity. The locking lever 10 may have, for example, a different shape than in FIGS. 1 to 3, as shown in FIG. 4. The position of individual parts in FIG. 4 now essentially corresponds to that in FIG. 1 for example: carriage 4 is in the position in which it is pushed the farthest into an interior of the vehicle body 6; the locking lever 10 takes up a position which cannot be rotated counterclockwise or can hardly be rotated farther; and, the roller 11 is situated in the curved part 12b of the connecting link or groove 12 at some, although narrow, distance from a transition point 18.

In FIG. 4 and in some of the figures which follow, a shape of the groove 12 may be indicated by the center line 12'. A transition between the linear section 12a and the curved section 12b is marked by a small circle around the transition point 18. It is also illustrated that the center line 12' of the groove 12 in the curved section has a curvature shape or circular arc 12c around the axis of rotation 9 in this position of the carriage 4. Furthermore, it is shown that the center 11' of the roller 11 is situated in the curved section 12b and therefore has a distance from the transition point 18, in the illustrated example, of 5°.

A significance of this shaping and this position is that forces acting upon the door wing 3, which does not apply to driving and guiding forces during operation but to forces which are exercised intentionally or unintentionally upon the door wing 3 by passengers, such as, for example, impacting during cornering, leaning by persons, use during standing room conditions, acts by vandals, pressure differences when traveling through tunnels or during passing of trains, if a resultant force is aimed at least approximately horizontally upon the door wing 3 toward the outside—exercise a force upon the carriage 4 in the direction of the arrow H. Vertical components of the forces, which are transmitted to the carriage 4, are taken over by the guide 5 in which the carriage 4 is disposed by rollers 11 in the illustrated embodiment.

The only reaction forces which can act against horizontal force H are the forces occurring between the roller 11 and the groove 12. These may occur (friction neglected) only normally on a joint tangential plane in a contact area between a surface of the roller 11 and a surface of the groove 12 wall (direction N) which, however, because of the described geometrical conditions, coincides with a straight connection line in direction R between the axis of rotation 9 and the axis 11' of rotation of the roller. Thus, R=N. This means that, when large forces H occur, no moment is created at the locking lever 10, so that the carriage 4 cannot start moving and therefore the door wing 3 can also not move in the opening direction. The horizontal component of the normal force N balances the applied horizontal force H. Therefore, the door is locked.

Figure 5:
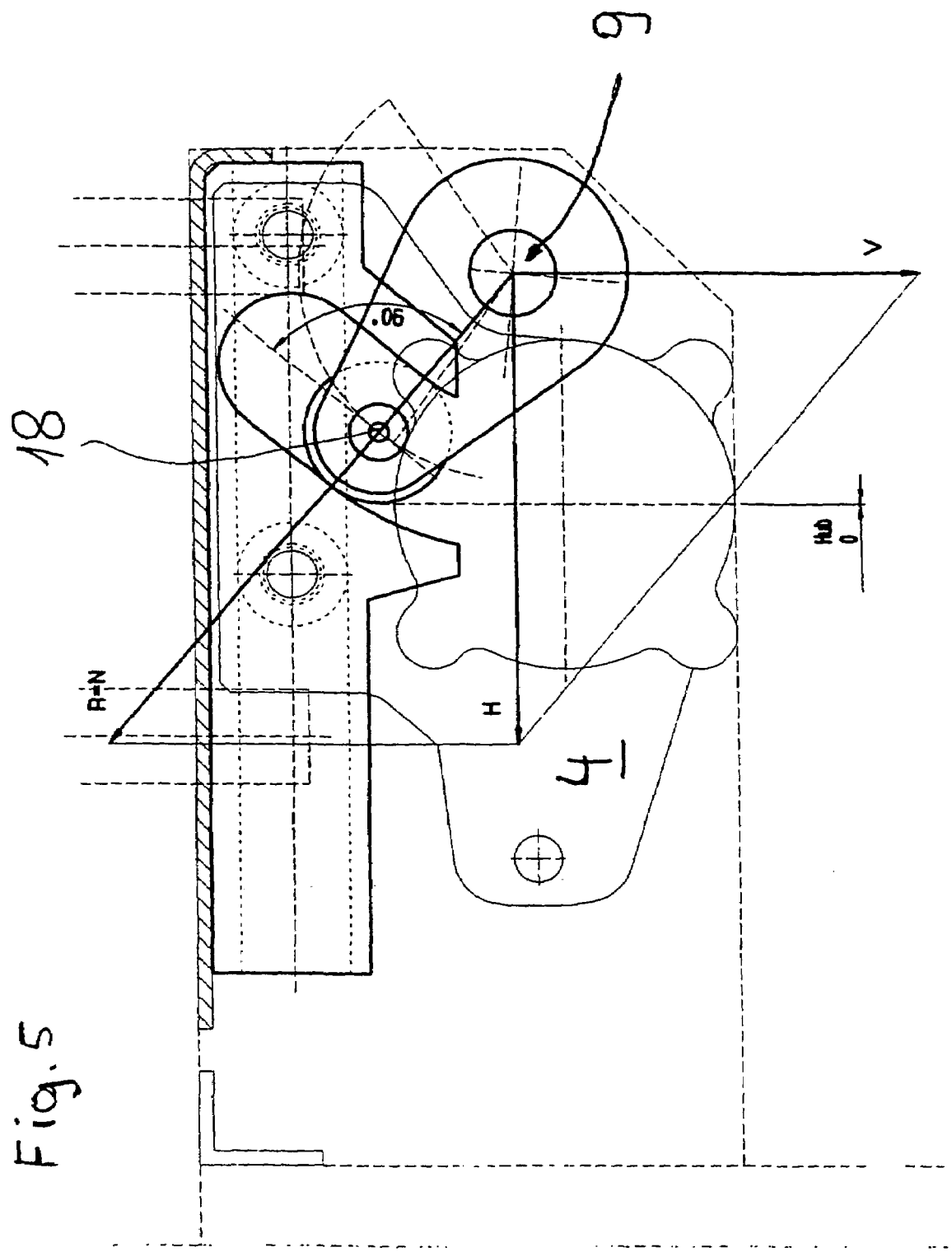

When the normal opening movement is now initiated, as illustrated in FIG. 5, by a torque exercised on the locking lever 10, the axis 11' of rotation of the roller 11 arrives at the transition 18 between the linear section 12a and the bent or curved section 12b of the groove 12 and thus at a boundary of the area in which the above-mentioned facts apply. During this rotation, in the illustrated embodiment, 5° between the end position according to FIG. 4 and the neutral limit position according to FIG. 5, the carriage 4, indicated at the axis of rotation of the motor (FIG. 3), carries out no lift. That is, this movement is not made more difficult by any large forces H in the horizontal direction.

This is a contrast to previously known over-dead-center mechanisms, in the case of which, in the course of movement from a locked end position to a boundary position, it had been necessary to "overcome the dead center". When applied to the illustrated embodiments herein, this corresponds to a low but still noticeable movement of the carriage 4 against the force N, so that, in the event of panic or simply high forces, an overcoming of the dead center is made difficult and in the case of a manual opening, for example when panic occurs, is made almost impossible.

Figure 6:
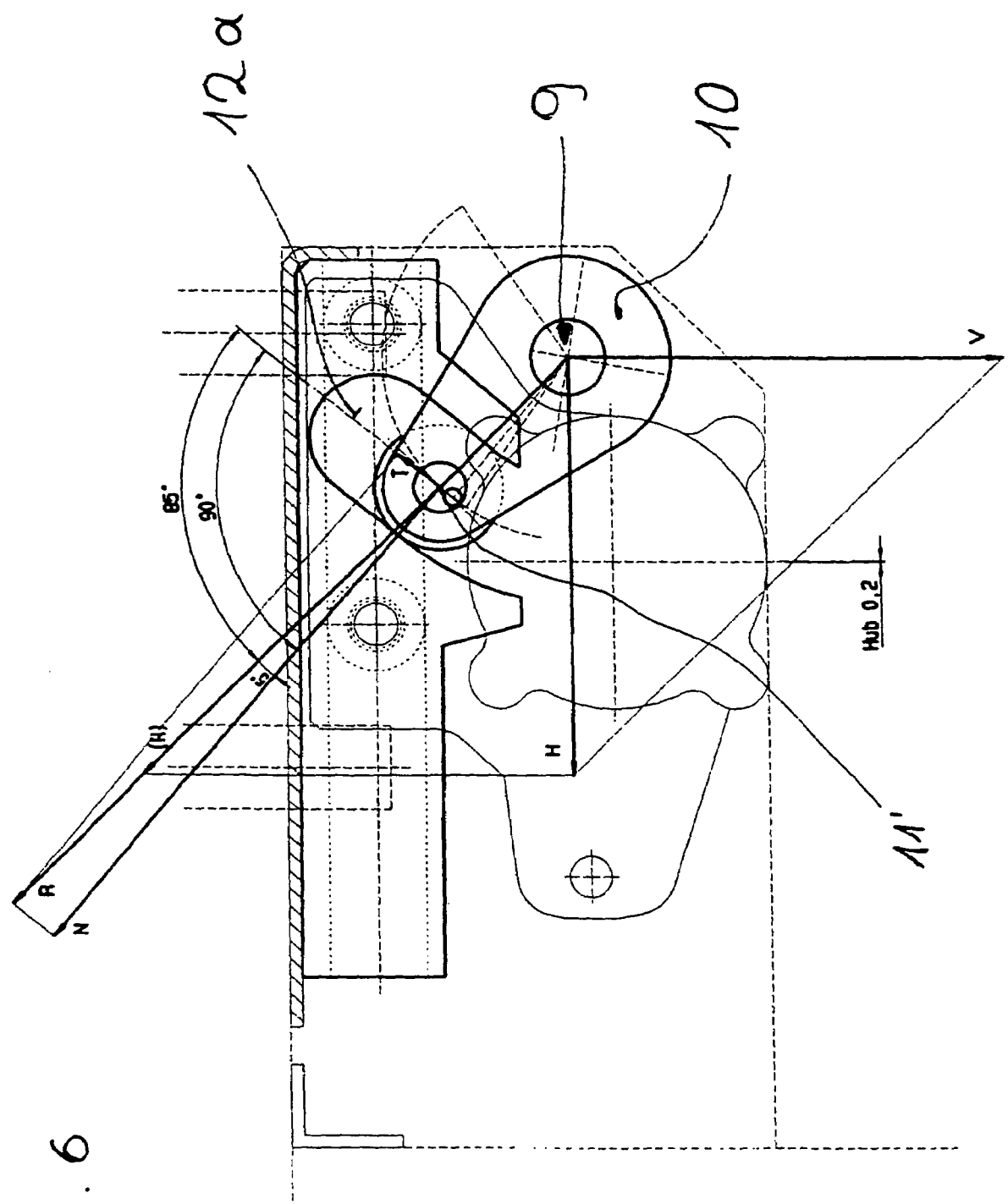

FIG. 6 illustrates how, during entry into the linear section 12a of the groove 12, a lift movement starts. As a result of a gapping of the normal force N between the roller 11 and a wall of the groove 12, and of radial direction R as the connection line between the axis of rotation 9 and the roller axis 11' by the horizontal force H, a torque, caused by a tangential force T upon the locking lever 10, acts in the opening direction.

Figure 7:
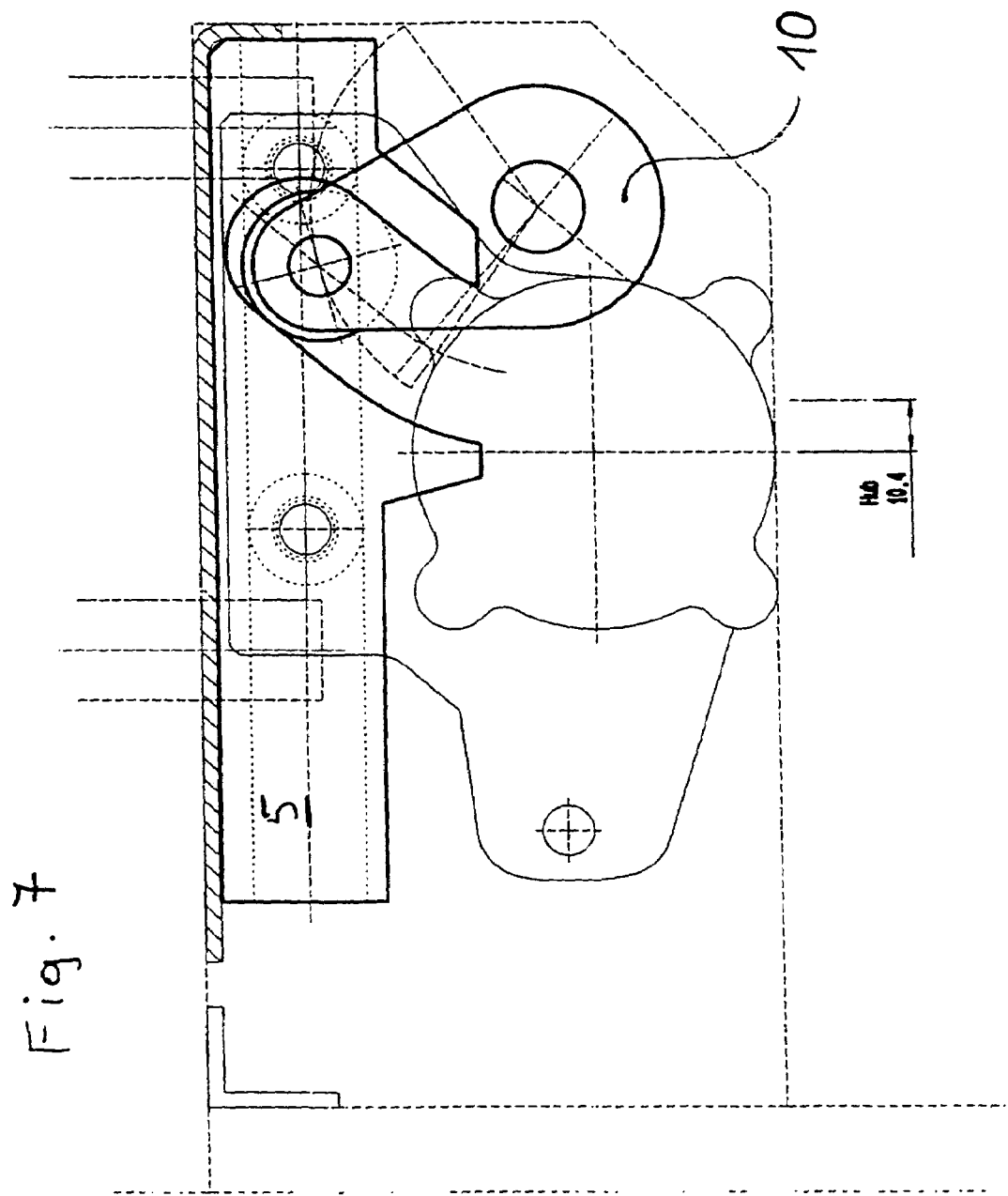
Figure 8:
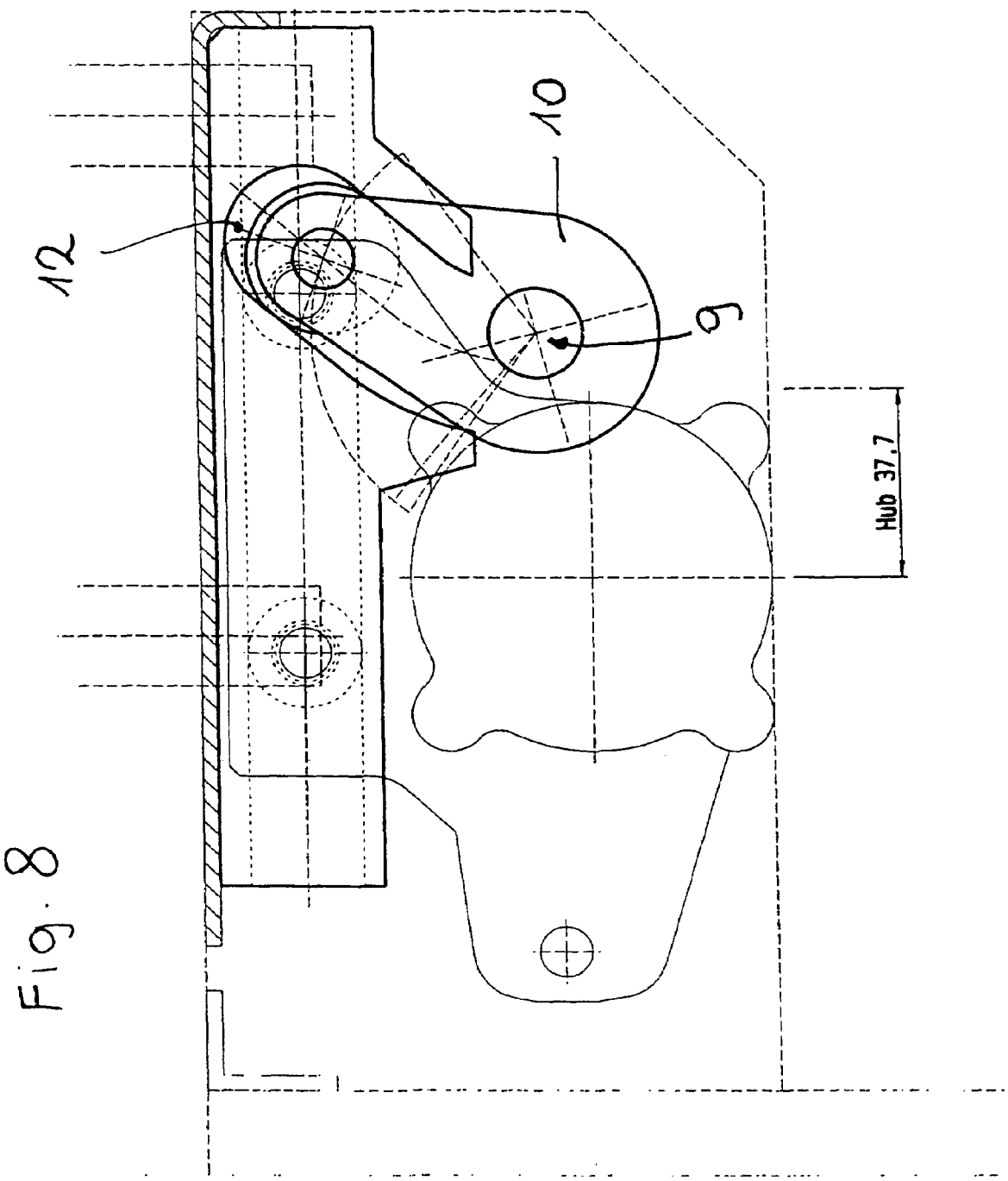

In the case of a further progressing lift, FIG. 7 shows the locking lever 10 in an almost normal direction to the guide 5. FIG. 8 shows the situation in the case of a more rotated locking lever 10 which has started to move out of the groove 12 again.

Figure 9:
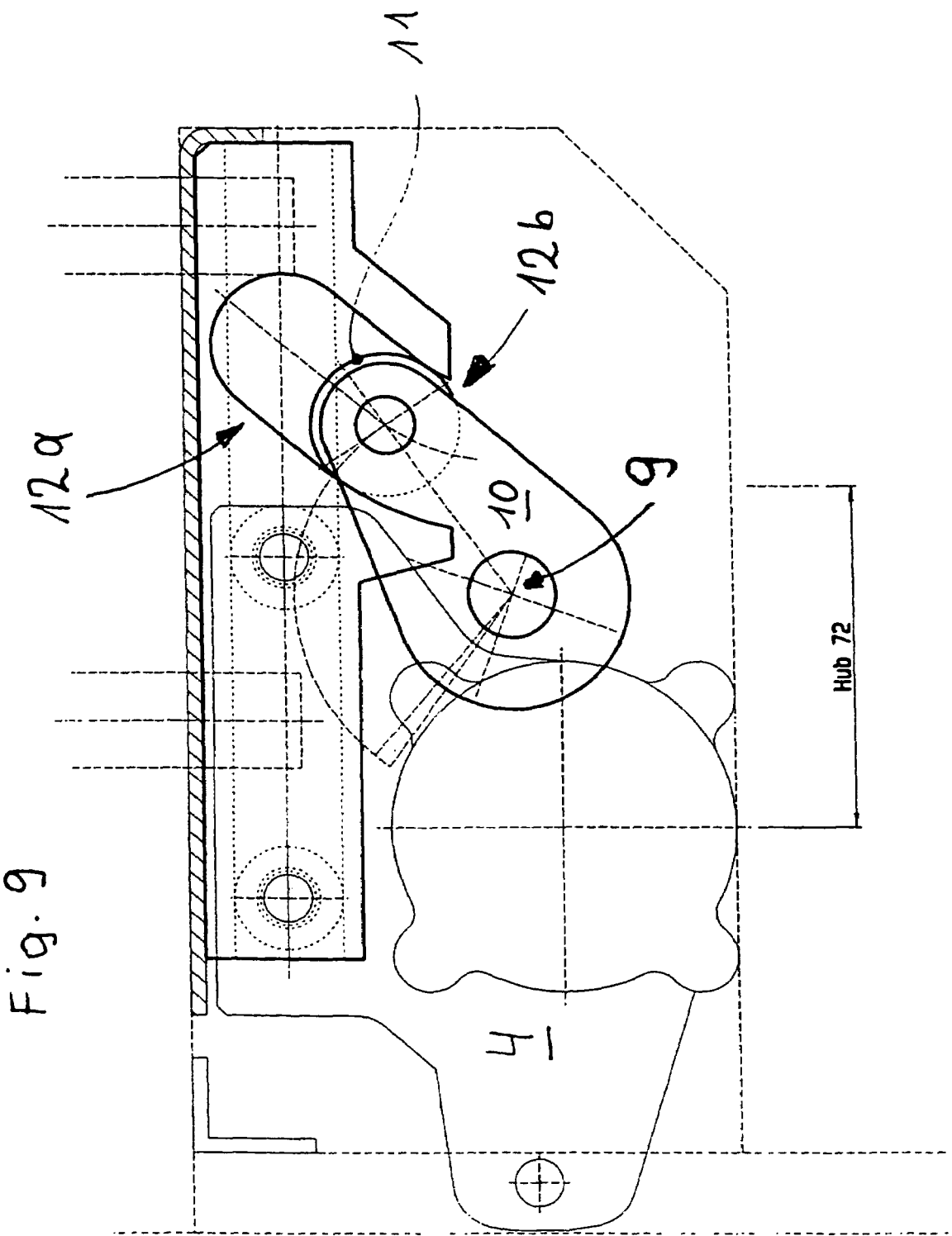

FIG. 9 shows a fully moved-out end position. The roller 11 again arrives at or in the curved area 12b, but this may not be important with respect to the locking because of the completely displaced position of the axis of rotation 9 which moves along with the carriage 4.

In the course of the move-out movement illustrated in FIGS. 4 to 9, the displacement of the door wing 3 also starts along with the telescope 7 (FIG. 1). The sequence of these two movements is caused by a guide which is fixedly arranged with respect to the vehicle body 6 and which also (unless other stop mechanisms, for example, in the guide 5 are provided) causes the end of the move-out movement of the carriage 4. As a result of this fixing of the carriage 4, the moment, which is required for rotating the spindle 17 (FIG. 2), becomes smaller than the holding moment by the fixed carriage acting upon the motor housing (gear 14'), so that the rotating movement of the spindle 17 starts. It is also conceivable to implement the displacing movement of the door 1 in a different manner. The plurality of the known drives can be combined together with the locking device 13 according to the present disclosure for the door 1 in the closed position.

The closing movement of the door 1 takes place in the reverse sequence as previously described for the opening movement: first, by the motor, whose housing and the gear 14' connected therewith is fixed, a rotation of the spindle 17 is caused in the closing direction; second, when the door wing 3 approaches its closed position, the guide (not shown), which is fixedly connected with the vehicle body 6, has the result that the carriage 4 can be moved in the direction away from the exterior vehicle side A, whereupon the moment of reaction at the gear 14' initiates this movement which now, in the sequence of FIGS. 9, 8, 7, 6, 5 and finally 4, reestablishes the closed position in the locked position.

As illustrated here by a comparison between FIGS. 5 and 4, during the movement of the connection line between the axis of rotation 9 and the roller axis 11' by way of the transition point 18 of the guide 12, the coinciding of reaction forces originating from the horizontal force H and the radial force R with the resulting normal force N is ensured so that a locking takes place without the exceeding of a dead center.

As initially mentioned, the position of the locking lever 10 is secured in the position illustrated in FIG. 4, for example, by a weak torsion spring in a bearing of the locking lever 10 about the axis 9 or by a form-locking locking by a pin or the like, which projects into the groove 12 at a fitting point. Such securing devices may also be necessary in the case of the known excess pressure mechanisms, because the latter reliably remain in the locked position only in the case of a continuously applied force in the opening direction, while, in a completely unloaded condition, they may unlock in an undesirable manner as a result of vibrations or the like.

Concerning the different shapes of the locking lever 10 in FIGS. 1 to 3 and FIGS. 4 to 9, it should also be noted that, in FIGS. 1 to 3, this lever 10 may also be used for operating a holding device for the door wing 3 arranged at a lower door end. As illustrated in FIGS. 1 and 2, in the course of the opening of the door 1, an upper linkage point of an operating rod or lever 19 moves upward, so that a holding or release movement can be derived therefrom. It is also conceivable to construct this operating lever 19 as part of an emergency operating device. As a result of such an emergency operating device, the moment required for the opening can be applied directly to the locking lever 10, independently of the motor.

Although the present disclosure has been described and illustrated in detail, it is to be clearly understood that this is done by way of illustration and example only and is not to be taken by way of limitation. The scope of the present disclosure is to be limited only by the terms of the appended claims.

I claim:

1. A pivoting sliding door for vehicles, particularly rail vehicles or lift cabins, comprising:
   a vehicle body;
   at least one door wing which, in a closed position is arranged within the vehicle body and which, in an opened position is arranged in front of and on an exterior side of the vehicle body having a longitudinal side defining a longitudinal axis;
   at least one driving device;
   at least two transverse guiding devices;
   at least one longitudinal guiding device to permit a movement of the at least one door wing parallel to the longitudinal axis of the vehicle body, the at least one longitudinal guiding device being moved by the at least two transverse guiding devices, and the at least one door wing being locked by a pivoting part that engages in one of the at least two transverse guiding devices; and
   wherein the pivoting part has an axis of rotation and includes a guiding part that interacts with a guiding element and when the door is in the closed position the guiding part interacts with the guiding element in area of the guiding element having a curved section, the curved section being configured such that when the guiding part interacts with the curved section of the guiding element the at least two transverse guiding devices do not move the at least one longitudinal guiding device.

2. The pivoting sliding door according to claim 1, wherein the guiding element includes a section extending in a straight line and in which section the pivoting part interacts during a door opening.

3. The pivoting sliding door according to claim 2, wherein, in the closed position of the at least one door wing, the guiding part of the pivoting part is positioned at a distance from a transition point connecting the curved section and the section extending in a straight line.

4. The pivoting sliding door according to claim 1, wherein the pivoting part is rotatable about the axis of rotation arranged on one of the at least two transverse guiding devices carrying out the movement along the longitudinal axis.

5. The pivoting sliding door according to claim 4, wherein the pivoting part is pivoted about the axis of rotation by a moment of reaction of a driving motor acting upon the at least one longitudinal guiding device and the pivoting part is arranged on the at least one transverse guiding device.

6. The pivoting sliding door according to claim 1, wherein the curved section corresponds at least essentially to a curvature which a circle has in a center at a point at which the axis of rotation is situated when the door is closed.

* * * * *